US009435356B1

(12) United States Patent
Mallick et al.

(10) Patent No.: US 9,435,356 B1
(45) Date of Patent: Sep. 6, 2016

(54) LIGHTWEIGHT PISTON ACCUMULATOR

(71) Applicant: Steelhead Composites, LLC, Golden, CO (US)

(72) Inventors: Kaushik Mallick, Thornton, CO (US); Andrew Coors, Morrison, CO (US); Annalisa Padget-Shields, Golden, CO (US)

(73) Assignee: STEELHEAD COMPOSITES, LLC., Golden, CO (US)

( * ) Notice: Subject to any disclaimer, the term of this patent is extended or adjusted under 35 U.S.C. 154(b) by 0 days.

(21) Appl. No.: 14/798,328

(22) Filed: Jul. 13, 2015

(51) Int. Cl.
*F16L 55/04* (2006.01)
*F15B 1/24* (2006.01)

(52) U.S. Cl.
CPC ............ *F15B 1/24* (2013.01); *F15B 2201/312* (2013.01); *F15B 2201/405* (2013.01)

(58) Field of Classification Search
CPC ...... F16L 2201/31; F16L 55/053; F15B 1/24
USPC ...................................................... 138/31, 30
See application file for complete search history.

(56) References Cited

U.S. PATENT DOCUMENTS 2,417,873 A * 3/1947 Huber ........................ F15B 1/24 138/31
2,715,419 A * 8/1955 Ford ........................ F15B 1/24 138/31
2,742,929 A * 4/1956 Treseder .................. F15B 1/24 138/31
3,004,561 A * 10/1961 Henry ...................... F15B 1/24 138/31
4,403,629 A * 9/1983 de Vries .................... F15B 1/08 138/31
4,651,782 A * 3/1987 Fulmer ..................... F15B 1/24 138/31
7,108,016 B2 9/2006 Moskalik et al.
7,661,442 B2 2/2010 O'Brien, II et al.
7,984,731 B2 7/2011 Rajabi et al.
8,020,587 B2 * 9/2011 Gray, Jr. ................ F15B 1/024 138/31
8,662,343 B1 * 3/2014 Coors ....................... F17C 1/12 206/0.6
8,695,643 B2 4/2014 Rajabi et al.
2003/0034079 A1 * 2/2003 Lee ......................... F16L 55/04 138/31
2005/0194054 A1 9/2005 Moskalik et al.
2008/0314467 A1 12/2008 Gray, Jr.
2009/0126816 A1 5/2009 Rajabi et al.
2012/0067446 A1 3/2012 O'Brien, II et al.
2015/0144216 A1 * 5/2015 Pippes ...................... F15B 1/24 138/31

FOREIGN PATENT DOCUMENTS

WO 2006/096620 A2 9/2006
WO 2011/023747 A1 3/2011

OTHER PUBLICATIONS

2014 Parker Hannifin Corporation, Catalogue HY07-1410/UK, POD, Aug. 2014, ZZ.

* cited by examiner

*Primary Examiner* — Patrick F Brinson
(74) *Attorney, Agent, or Firm* — Don D. Cha; Hamilton DeSanctis & Cha, LLP

(57) ABSTRACT

The present invention provides a hydraulic pressure accumulator having a pressure vessel and a piston chamber that is located within the interior space of the pressure vessel. In one particular embodiment, the invention relates to filament wound composite overwrapped hydraulic pressure accumulators with serviceable pistons.

14 Claims, 4 Drawing Sheets

LIGHTWEIGHT PISTON ACCUMULATOR

FIELD OF THE INVENTION

The present invention relates to hydraulic pressure accumulators. In one particular embodiment, the invention relates to filament-wound composite overwrapped hydraulic pressure accumulators with serviceable pistons.

BACKGROUND OF THE INVENTION

A hydraulic accumulator is essentially an energy storage device. Accumulators are widely used in mobile and industrial hydraulics to store energy, dampen pulsations, compensate for thermal expansion, and/or provide auxiliary power. It generally consists of a high pressure vessel in which a non-compressible hydraulic fluid is held under pressure by an external source. These accumulators are based on the principle that gas is compressible and fluid (e.g., oil or other similar liquid) is relatively incompressible. In operation, fluid or oil flows into the accumulator and compresses the gas by reducing its storage volume. Energy is stored in the compressed gas held under pressure. If the fluid is released, it will quickly flow out under the pressure of the expanding gas, thereby dispensing the stored energy.

A bladder accumulator consists of pressure vessel with an internal elastomeric bladder with pressurized nitrogen inside the bladder and hydraulic fluid outside the bladder but contained within the vessel. The accumulator is charged with gas, typically nitrogen, through a valve installed on the top. In a bladder accumulator, the energy is stored by compressing the gas encapsulated within an elastomeric (e.g., rubber) bladder. Energy is released when the hydraulic fluid out of the accumulator's fluid port, thereby decompressing the bladder by allowing it to expand.

The main advantages of a bladder accumulator are fast acting, no hysteresis, not susceptible to contamination, lower cost and consistent behavior under similar conditions. However, bladder accumulators have limitations in applications that require extremely high flow rates, tolerance of temperature extremes, high compression ratios, ability to withstand external forces and/or mounting restrictions. In addition, bladder accumulators typically cannot provide peak power when mounted horizontally or when they are subjected to centrifugal forces perpendicular to their longitudinal direction.

Piston accumulators alleviate many of these issues. A piston accumulator has a piston which slides against the accumulator housing on seals. On one side of the piston is a gas (again typically nitrogen) and on the other side is the hydraulic fluid and connection to the system. A fill port allows pressurization of the nitrogen. One of the advantages of piston accumulators is its ability to provide higher mass flow rate of the hydraulic fluid than bladder accumulators. This means that piston accumulators promise a higher specific power (delivered power per mass of the accumulator) that can be advantageous in mobile applications. Piston accumulators also do not have a bladder that has a finite fatigue life resulting from severe deformation in each cycle, thereby requiring replacement of bladders at regular intervals. In contrast, the seals in the reciprocating piston typically do not require maintenance as frequent as bladder accumulators.

As discussed above, bladder accumulators have limitations when operating at extremely cold or warm temperatures. In contrast, depending on the type of seal used, piston accumulators can have application in a much wider temperature range.

Failure of bladder accumulators is typically sudden and results in leaking of their stored gas into the hydraulic system. In contrast, piston accumulators, because of their small seal surface, generally tend to fail gradually. Thus, even when the piston accumulators begin to fail, the migration of gas from the gas side to the fluid side is slow, leaving a sufficient time for servicing to correct gas leaks into the hydraulic fluid system.

While bladder accumulators generally perform best when mounted vertically with the fluid port at the bottom and gravity assisting in the flow of the fluid, piston accumulators can be mounted in any position. In addition, the performance of bladder accumulators is significantly reduced when subjected to centrifugal forces or Coriolis forces. A piston accumulator is not affected by these forces.

Unfortunately, traditional piston accumulators are made of steel with elaborate machining operation and are generally very heavy. Typically, thick steel cylindrical chambers are used to support the structural load as well as to house the reciprocating piston. Some accumulator manufacturers have attempted to reduce the overall weight of these piston accumulators by substituting steel with structural composite overwrapped over legacy steel chamber designs.

Despite many different hydraulic pressure accumulators that are available, there is a continuing need for a lightweight serviceable hydraulic pressure accumulator.

SUMMARY OF THE INVENTION

Some aspects of the invention provide a hydraulic pressure accumulator that is lightweight, adaptable for servicing, while providing various advantages of piston accumulators.

In one particular embodiment, the invention utilizes a hydraulic pressure accumulator that comprises a vessel body and a piston chamber that is disposed within the interior space of the vessel body. The piston chamber acts as a piston accumulator. However, unlike conventional piston accumulators, the piston chamber does not require a thick steel cylindrical member to support the structural load. The majority of pressure exerted by the fluids in hydraulic pressure accumulator of the invention is carried by the vessel body and not the piston chamber itself.

DETAILED DESCRIPTION OF THE INVENTION

The present invention will be described with regard to the accompanying drawings which assist in illustrating various features of the invention. In this regard, the present invention generally relates to hydraulic pressure accumulators. That is, the invention relates to hydraulic pressure accumulators that comprise a piston accumulator within the interior of a composite pressure vessel. In this manner, the pressure carrying capability of piston accumulators is separated from the piston accumulator's functionality. The majority, if not all, of stored energy of compressed gas and the pressurized fluid is endured by the composite pressure vessel itself and not by the piston accumulator chamber.

In some embodiments, the composite pressure vessel comprises a metal lined composite pressure vessel with a large, metallic port opening that allows facile assembly, servicing and maintenance of a lightweight and detachable cylindrical piston (i.e., piston accumulator) housed inside of the composite pressure vessel.

Exemplary embodiments of hydraulic pressure accumulators are generally illustrated in the accompanying FIGS. 1 to 4, which are provided solely for the purpose of illustrating the practice of the present invention and which do not constitute limitations on the scope thereof.

It has been found that the performance of bladder accumulators does not meet its full potential when these accumulators are mounted horizontally. The present inventors have discovered that piston accumulators would provide better performances over bladder accumulators in certain applications, such as those discussed above. Some of these applications experience variable mounting positions (e.g., mobile applications of earth movers and excavators), centrifugal forces (e.g., pitch control of wind turbine blades), Coriolis forces (e.g., aeronautical applications such as airplanes and helicopters) and operation in extreme temperatures (e.g., hydraulic hybrid) that can benefit from lightweight piston accumulators.

Figure 1:
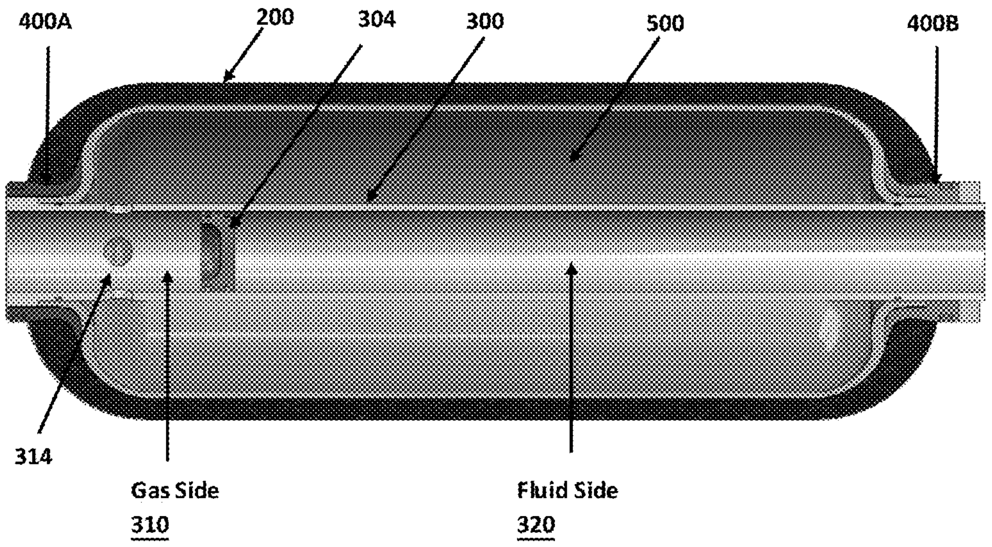
FIG. 1 is a cut away 2-D view of one embodiment of the lightweight piston accumulator of the invention.
Figure 2:
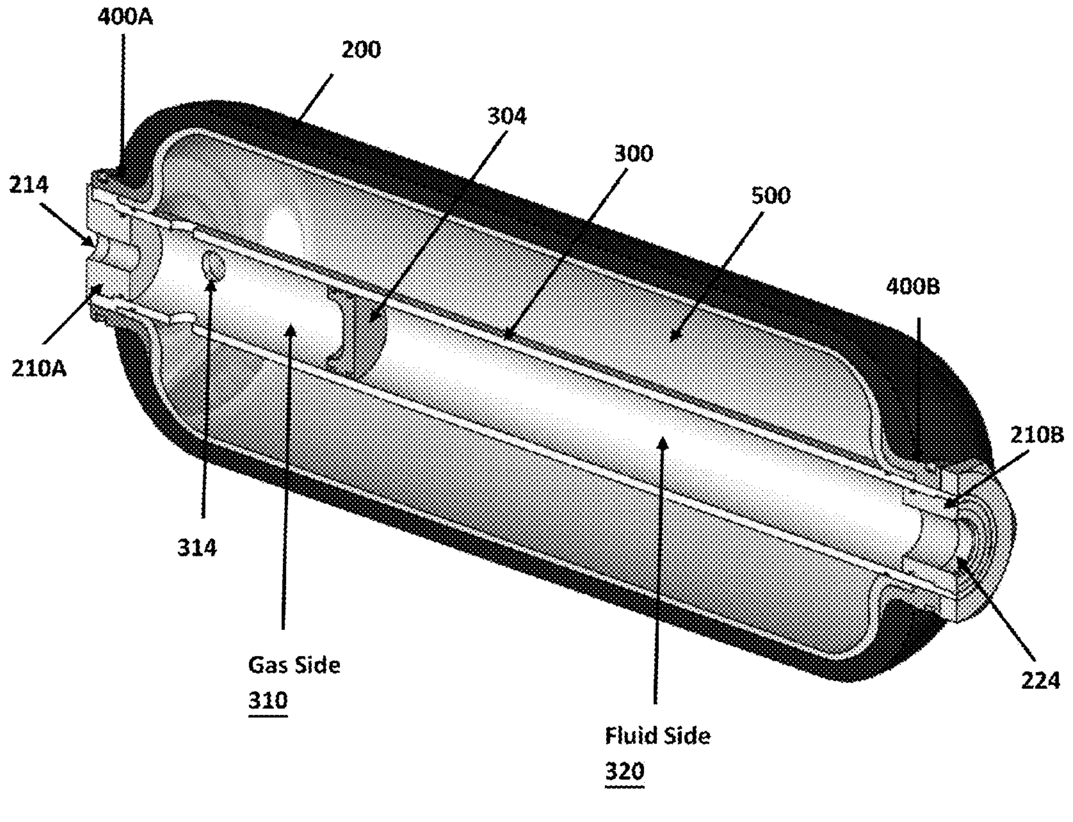
FIG. 2 is a cut away 3-D view of one embodiment of the lightweight piston accumulator of the invention.
Figure 3:
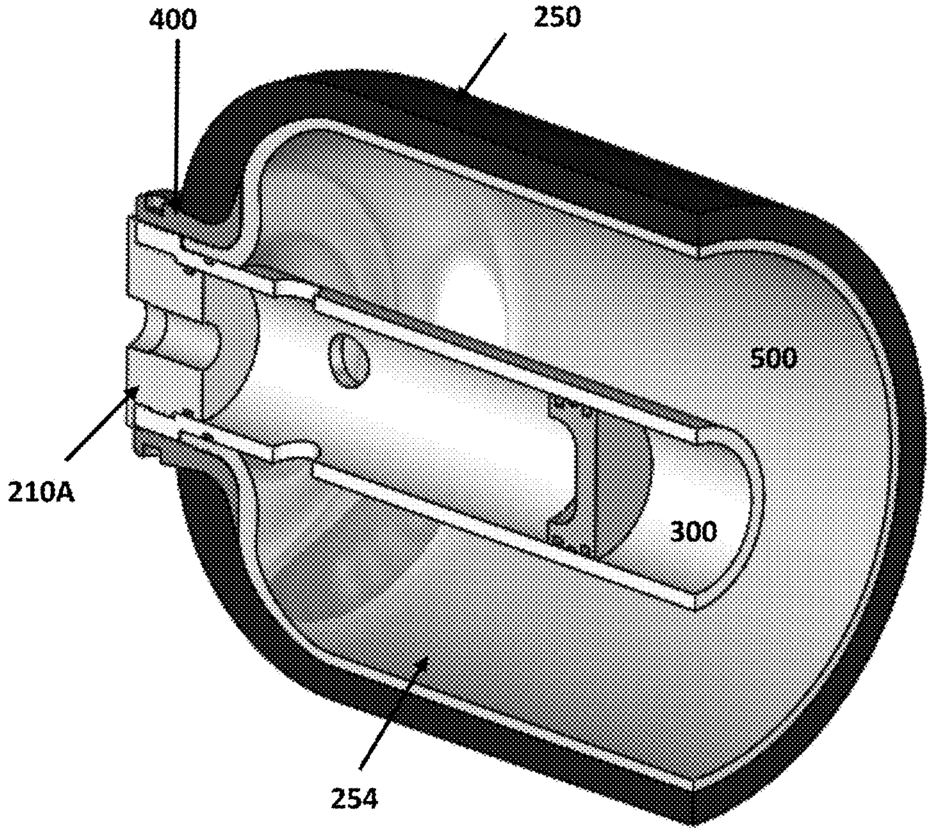
FIG. 3 is a partial cut away 3-D view of one embodiment of the lightweight piston accumulator of the invention showing the expanded gas side view.

FIGS. 1 to 4 depict some of the embodiments of the invention for hydraulic pressure accumulator 100. As can be seen, hydraulic pressure accumulator 100 comprises a vessel body 200 and a piston chamber 300. Suitable materials for vessel body 200 comprise carbon fiber composite, glass fiber composite, or one of many other strong and lightweight composite materials, such as may be found for high pressure composite pressure vessels. As can be seen in FIG. 3, in one embodiment, vessel body 200 comprises a composite overwrap 250 (e.g., carbon fiber, glass fiber, or other strong and lightweight materials) and a liner 254. Suitable materials for liner 254 include, but are not limited to, metals, alloys, ceramics, plastics, or any other strong and non-permeable materials. Typically, the liner 254 comprises a ductile and fatigue resistant material. As used herein, the term "non-permeable" refers to a material that does not allow gas to leak under the normal operating pressure conditions. Typically, the non-permeable material shows no significant (e.g., <0.1% over a period of one week) gas leakage at the vessel's operating pressure.

Vessel body 200 can also include polar bosses 400A and 400B that reside at the ends of vessel body 200 to provide access to the interior of vessel body 200. Typically, polar bosses 400A and 400B are embedded or conjoined within liner 254, if liner 254 is provided. One particular embodiment of polar bosses include those disclosed in the commonly assigned U.S. patent application Ser. No. 14/282,160, which is incorporated herein by reference in its entirety.

As can be seen, piston chamber 300 resides within vessel body 200. Piston chamber 300 can be welded to vessel body 200 (e.g., at polar boss 400A by means of a weld joint) or can be threaded into polar boss 400A. When piston chamber 300 is attached to vessel body 200 via a thread, a seal (not shown) can be used to prevent any leakage of gas and/or hydraulic fluid. Other joining means, e.g., a male-female joint connection with an appropriate sealing means) may alternatively be employed.

In one embodiment, end plugs 210A and 210B are used to seal the ends of vessel body 200. In particular, end plugs 210A and 210B are placed within polar bosses 400A and 400B to place piston chamber 300 in place within vessel body 200. End plugs 210A and 210B can also include gas port orifice 214 and fluid port orifice 224, respectively.

Fluid port orifice 224 communicates with fluid sources (not shown) external to hydraulic pressure accumulator 100. Similarly, gas port orifice 214 communicates with gas sources (not shown) external to hydraulic pressure accumulator 100. Typically, gas port orifice 214 and fluid port orifice 224 are closeable or resealable such that the orifices can be opened or closed to allow pressure variation.

Piston chamber 300 also includes a cylindrical non-permeable body. The inner diameter of vessel body 200 is greater than the outer diameter of cylindrical body of piston chamber 300 and forms annular volume 500 between vessel body 200 and piston chamber 300. Generally, the ratio of the inner diameter of vessel body 200 and the outer diameter of piston chamber 300 is at least about 2:1, typically at least about 1.5:1, and often at least about 1.25:1.

As can be seen, piston chamber 300 is disposed within the interior space of vessel body 200 and is substantially concentric with the cylindrical vessel wall of vessel body 200. The piston chamber 300 also includes a piston 304 within the interior space of piston chamber 300. Piston 304 is slidably disposed within the interior space of piston chamber 300 thereby separating piston chamber 300 into a first chamber 310 and a second chamber 320. First chamber 310 contains a gas adapted to be compressed under pressure, and second chamber 320 contains pressurized fluid in fluid communication with an external fluid source through fluid port orifice 224.

Within first chamber 310, typically near polar boss area 400A, piston chamber 300 also includes an orifice 314 configured to allow communication between first chamber 310 and annular volume 500. In some instances, a plurality of orifices 314 can be present in first chamber 310. This configuration allows the majority, if not substantially all, of the pressure exerted by the gas to be supported by vessel body 200 rather than by piston chamber 300. Orifice 314 is typically located within first chamber 310 such that even when piston 304 is at the extreme end of first chamber 310, no hydraulic fluid can leak through orifice 314 due to the thickness and/or the design of the piston 304.

In some embodiments, first chamber 310 can also include a foam, an elastomeric material, a traditional coiled metallic spring, a set of composite bellow springs, a bellow or other compressible device or material in addition or alternative to gas.

While not shown, it should be appreciated that because hydraulic pressure accumulator of the invention is designed to allow communication of gas between first chamber 310 and annular volume 500, one can design piston chamber 300 such that the length of piston chamber 300 is shorter than the length of vessel body 200 from one polar boss end to the other (e.g., from 400A to 400B). Such a configuration would result in the end of first chamber 310 "hanging" or dangling within annular volume 500. In such embodiments, orifice 314 is not required.

Typically, however, the length of piston chamber 300 runs at least from gas port orifice 214 to fluid port orifice 224.

As hydraulic fluid enters and exits via port 224, piston 304 moves longitudinally within piston chamber 300 in reaction to forces resulting from the balancing of pressure between the gas in first chamber 310 and the fluid in second chamber 320. Charge gas can be prevented from contacting the fluid by means of piston seal (not shown). In some instances, dynamic radial seals (not shown) are present encircling piston 304. Such dynamic radial seals are well known in the art and act to facilitate its longitudinal movement within piston chamber 300.

Preparing hydraulic pressure accumulator 100 for operation generally involves pre-charging the gas side. During pre-charging a gas (e.g., nitrogen or any other suitable gas known to one skilled in the art) is introduced into first chamber 310 and annular volume 500 (via orifice 314) through gas port orifice 214 at a designated pre-charge pressure, e.g., 1000 psi, 2000 psi, 5000 psi or even up to 10000 psi. The pressure of the initial gas charge causes piston 304 to move longitudinally toward the opposite end of piston chamber 300, expelling fluid from second chamber 320 if any present as the piston sweeps through it. To retain the charge gas, gas port orifice 214 is sealed by conventional gas valve means as is known in the art. In this manner, hydraulic pressure accumulator 100 is brought to its proper pre-charge pressure. At the beginning of the operation of the hydraulic system, hydraulic fluid is introduced into the second chamber 320 through fluid port orifice 224 so as to cause second chamber 320 to be filled with fluid and piston 304 slides towards the first chamber 310. As one skilled in the are can readily recognize, the piston 304 slides towards first chamber 310 until the pressure equilibrium is reached between first chamber 310 (which also includes annular volume 500) and second chamber 320. To store energy in hydraulic pressure accumulator 100, fluid is pumped into second chamber 320 through fluid port orifice 224 by a hydraulic pump/motor or other means as is known in the art. Also as known in the art, this causes charged gas in first chamber 310 (and annular volume 500) to become compressed as fluid causes piston 304 to move towards first chamber 310.

Change in pressure in some instances causes temperature change within the charge gas. In order to avoid or reduce temperature increase during energy storage process (i.e., hydraulic fluid charging process), in some embodiments, interior of vessel body 200 comprises or is coated with a phase changing material ("PCM"). In another embodiment, first chamber 310 can be filled with PCM elastomer or foam that gets compressed during the energy storage process as piston 304 moves towards first chamber 310. Suitable PCMs are well known in the art. See commonly assigned U.S. Pat. No. 8,662,343, issued Mar. 4, 2014, which is incorporated herein by reference in its entirety. Briefly, typical PCM comprises a material that melts (i.e., changes phase from solid to liquid) at a certain temperature. The useful PCMs of the invention have a melting point in the range of from about 0° C. to about 80° C. typically from about 20° C. to about 50° C. In some embodiments, the piston chamber 300 can also include (or coated with) a PCM. Exemplary PCMs that are suitable for the invention include, but not limited to, organic materials such as paraffin and fatty acids, salt hydrates, water, eutectics, naturally occurring hygroscopic materials, metals and metallic particles, nano-materials. Some of the particular PCMs suitable for the invention include, but are not limited to, heptanone-4®, n-Unedane®, TEA_16®, ethylene glycol, n-dodecane, Thermasorb 43®, Thermasorb 65®, Thermasorb 175+®, Thermasorb 215+®, sodium hydrogen phosphate, Micronal®, and an assortment of other polymeric PCMs.

By utilizing composite overwrap pressure vessel, the present invention avoids gas loss problems while providing a relatively light weight piston accumulator system.

As discussed herein, in general piston chamber 300 that houses piston 304 is enclosed within a pressure vessel, i.e., vessel body 200. In one particular embodiment, pressure vessel (i.e., vessel body) 200 is a composite overwrapped pressure vessel and piston 304 comprises a material selected from the group consisting of a metal, a composite material, a ceramic, a reinforced polymer, and a combination thereof.

In another embodiment, vessel body 200 has port openings that can be at least partially closed using appropriate plugs. In one particular instance where vessel body 200 is of composite overwrapped pressure vessel, the port opening is facilitated by polar boss integrated with the liner and composite structure.

Assembly of hydraulic pressure accumulator 100 typically involves inserting piston chamber 300 into the pressure vessel 200 through the port opening. First chamber 310 is then charged with a compressible gas and second chamber 320 is filled with hydraulic fluid. Piston 304, optionally with radial seal(s), separates the gas and the fluid in the two compartments. One of the key elements of the invention is that annular area between piston chamber 300 and vessel body 200 (i.e., annular volume 500) is fully or partially filled with compressible gas. Having a communication pathway between first chamber 310 containing compressible gas and annular volume 500 allows the pressure load to be supported by vessel body 100.

The pressure in the compressed gas is structurally supported by vessel body 200. In one embodiment, vessel body 200 is a composite pressure vessel. In another embodiment, vessel body 200 is a composite shell overwrapped over impermeable liner such as metal or polymer.

Piston 304 slides towards first chamber 310 and compresses the gas when fluid enters second chamber 320 to bring equilibrium in pressure between the gas and fluid. Energy is stored in the compressed gas. When the pressure in second chamber 320 drops or when fluid leaves second chamber 320, piston 304 slides towards second chamber 320 thereby decompressing the gas and recovering the stored energy and allowing equilibrium in pressure between first chamber 310 and second chamber 320.

When first chamber 310 is partially or fully filled with elastomeric material, foam or other compressible material, such a material can also include a phase change material. When the gas is compressed quickly, it results in temperature rise. When the temperature settles, the pressure in the gas compartment drops. This results in less-than-desirable fluid volume that is expelled when the stored energy is recovered. Use of PCM in the gas compartment (i.e., first chamber 310) provides improved thermal management of the compressed gas during each energy storage and recovery cycle, and therefore allow hydraulic pressure accumulator of the invention to deliver peak power and operate more efficiently during each cycle.

In some embodiments, first chamber 310 comprises a spring like device that stores energy by compression. The spring can be made of metal, polymer, elastomer, PCM or composite. The spring can also be a metal, composite or elastomeric bellow.

One of the advantages of the invention is that piston chamber 300 is in neutral equilibrium, i.e., there is no pressure differential between the interior of piston chamber 300 and the exterior, i.e., annular volume 500). This net pressure differential allows, a wide variety of materials to be used as piston chamber 300. Suitable materials for piston chamber 300 include, but are not limited to, metal, metal alloy, ceramic, polymer, composite, etc. It can be machined or net formed to allow for circularity demanded for piston operation. In one particular embodiment, piston chamber 300 is made from metal that has been machined, honed and lapped to produce smooth interior surface. In another embodiment piston chamber 300 is made from thin metal, polymer or ceramic shell overwrapped with composite.

In some embodiments, after insertion inside pressure vessel 200, piston chamber 300 is sealed against the polar boss using radial seals. This prevents leakage of gas or fluid past the port opening of pressure vessel 200. The installation of piston chamber 300 inside of pressure vessel 200 can be achieved by using threads, special mechanical locks or attachments operated from outside of pressure vessel 200. End caps can be threaded or locked on to the port openings to allow for one gas filling port and a fluid port on each end of the accumulator.

Once the threads, special mechanical locks or attachments are removed from the port opening, piston chamber 300 can be retracted and removed from pressure vessel 200 for servicing of its interior surface, piston 304 or radial seals on piston 304.

The compression ratio and the energy and power storage capacity of hydraulic pressure accumulator of the invention is generally determined by the relative ratio between the diameter of piston chamber 300 and the diameter of pressure vessel 200. In one embodiment, the outer diameter of piston chamber 300 is very large (70-85%) compared to the inner diameter of pressure vessel 200 to keep the compression ratio greater than or equal to 2. This requires the polar opening of pressure vessel 200 to be a significant fraction of the inner diameter of pressure vessel 200.

Figure 4:
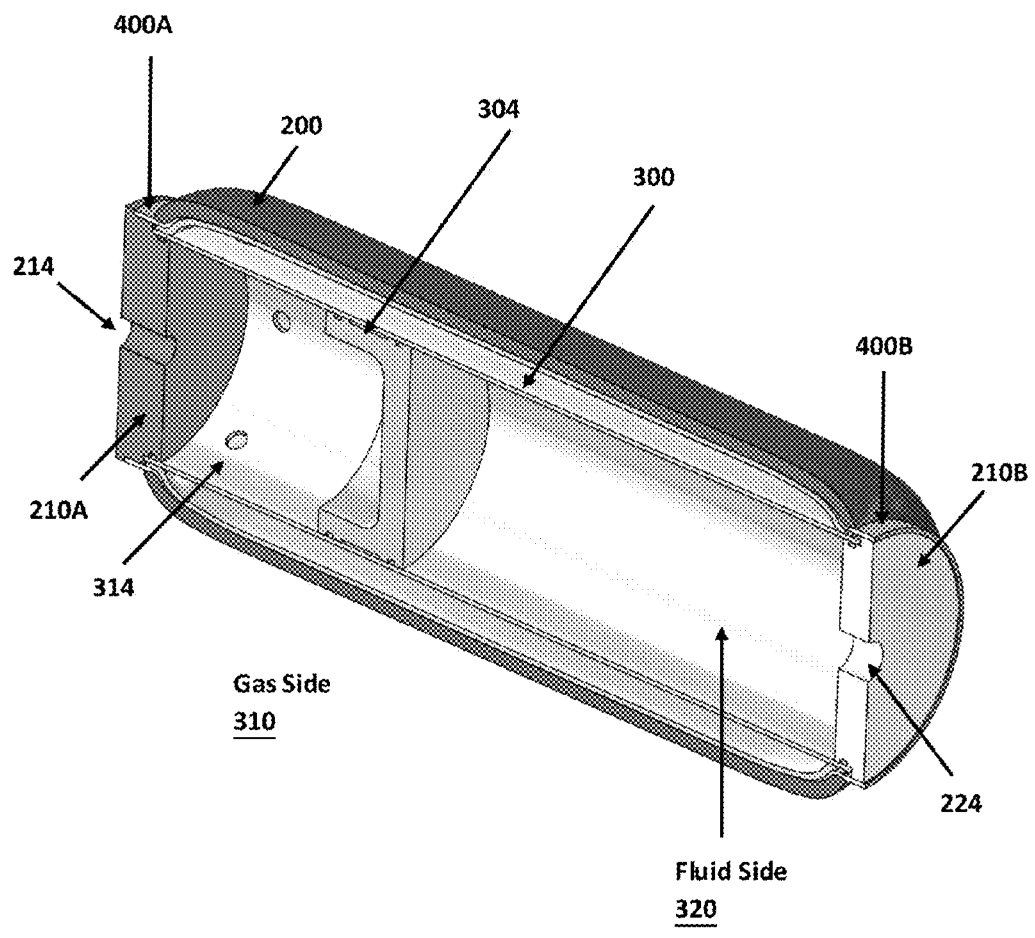
FIG. 4 is a cut away 3-D view of another embodiment of the lightweight piston accumulator of the invention.

Unlike monolithic and isotropic material like steel, a composite overwrapped pressure vessel with a large port opening can be designed to withstand very high internal pressure. This is enabled by an optimized design of the structural shape and composite layup such that the composite material is adequately and optimally placed to support the internal pressure. In one particular embodiment, the dome shape (e.g., non-cylindrical portion) of the composite pressure vessel can be selected that allows for geodesic filament winding of unidirectional composites with helical wind angle that optimizes the pressure carrying capability of the dome. In such case, the winding pattern allows for complete coverage of the pressure vessel with a polar opening diameter that is a significant fraction (between 50 and 90%) of the diameter of pressure vessel 200. In another embodiment as schematically shown in FIG. 4, a polar opening diameter that is 80% of the diameter of pressure vessel 200 can be achieved by utilizing a helical wind angle of ±54.5° resulting in a composite structure without the need for hoop or circumferential plies.

Piston chamber 300 can be designed to be integral to the structure of pressure vessel 200. The polar blowout load imposed on the end caps can be fully or partially supported by the wall of piston chamber 300 in its axial direction. The wall of piston chamber 300 can be designed to fully or partially support this axial load by optimizing the thickness of a metallic shell or a combination of metallic, polymeric, ceramic and composite shell.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. All references cited herein are incorporated by reference in their entirety.

What is claimed is:

1. A hydraulic pressure accumulator comprising:
- a vessel body comprising:
  - a cylindrical vessel wall;
  - an interior space;
  - a closeable gas port orifice on one end of said vessel body for communication with gas sources external to the hydraulic pressure accumulator; and
  - a closeable fluid port orifice on the other end of said vessel body for communication with fluid sources external to the hydraulic pressure accumulator;
- a piston chamber disposed within said interior space of said vessel body and substantially concentric with said cylindrical vessel wall, wherein said piston chamber comprises:
  - a cylindrical non-permeable body, wherein an inner diameter of said cylindrical vessel wall is greater than the outer diameter of said cylindrical body of said piston chamber thereby forming an annular volume between said cylindrical vessel wall of said vessel body and said cylindrical body of said piston chamber;
  - a piston chamber interior space; and
  - a piston slidably disposed within said piston chamber interior space thereby separating said piston chamber interior space into a first chamber containing a gas adapted to be compressed under pressure, and a second chamber containing pressurized fluid in fluid communication with said fluid port; and
  - an end plug placed within said piston chamber, wherein said end plug comprises a fluid port orifice,
- wherein said first chamber comprises an orifice configured to allow communication between said first chamber and said annular volume.

2. The hydraulic pressure accumulator according to claim 1, wherein an outer layer of said vessel body comprises a composite overwrap.

3. The hydraulic pressure accumulator according to claim 1, wherein said vessel body comprises a non-permeable liner.

4. The hydraulic pressure accumulator according to claim 3, wherein said non-permeable liner is made from a material comprising a metal, a polymer, a ceramic, a composite, or a combination thereof.

5. The hydraulic pressure accumulator according to claim 1, wherein the ratio of said inner diameter of said cylindrical vessel wall and said outer diameter of said cylindrical body of said piston chamber is at least 1.1:1.

6. The hydraulic pressure accumulator according to claim 1, wherein said first chamber comprises a plurality of said orifices that are configured to allow communication between said first chamber and said annular volume.

7. The hydraulic pressure accumulator according to claim 1, wherein the length of said piston chamber is at least from said gas port orifice of said vessel body to said fluid port orifice of said vessel body.

8. The hydraulic pressure accumulator according to claim 1, wherein said annular volume is filled with a compressible gas.

9. The hydraulic pressure accumulator according to claim 1, wherein said piston is circular in shape.

10. The hydraulic pressure accumulator according to claim 1, wherein said first chamber further comprises a foam, an elastomeric material, a metal or composite spring, a bellow or other compressible device or material.

11. The hydraulic pressure accumulator according to claim 1 further comprising a first annular seal on said piston, thereby reducing potential communication between said first chamber and said second chamber.

12. The hydraulic pressure accumulator according to claim 11 further comprising a single or plurality of dynamic radial seals on the circumference of the said piston that reduces potential communication between said first chamber and said second chamber.

13. The hydraulic pressure accumulator according to claim 1, wherein the interior of said vessel comprises a phase changing material.

14. The hydraulic pressure accumulator according to claim 10, wherein said foam comprises a phase changing material ("PCM").

* * * * *